United States Patent
Brown et al.

(10) Patent No.: US 10,150,501 B1
(45) Date of Patent: Dec. 11, 2018

(54) CONTROL SYSTEM FOR A VEHICLE

(71) Applicant: Hydro-Gear Limited Partnership, Sullivan, IL (US)

(72) Inventors: Alyn Brown, Indianapolis, IN (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 15/670,873

(22) Filed: Aug. 7, 2017

Related U.S. Application Data

(63) Continuation of application No. 14/790,675, filed on Jul. 2, 2015, now Pat. No. 9,725,114.

(60) Provisional application No. 62/020,612, filed on Jul. 3, 2014.

(51) Int. Cl.
- *B62D 1/12* (2006.01)
- *B62D 11/02* (2006.01)
- *B62D 11/00* (2006.01)
- *B62D 11/04* (2006.01)

(52) U.S. Cl.
CPC .......... *B62D 11/003* (2013.01); *B62D 11/04* (2013.01)

(58) Field of Classification Search
CPC ................................. B62D 1/12; B62D 11/02
See application file for complete search history.

(56) References Cited

U.S. PATENT DOCUMENTS

| | | |
|---|---|---|
| 4,296,361 A | 10/1981 | Archer |
| 4,738,417 A | 4/1988 | Wenger |
| 5,131,483 A | 7/1992 | Parkes |
| 5,644,903 A | 7/1997 | Davis, Jr. |
| 5,692,541 A | 12/1997 | Brown |
| 6,591,593 B1 | 7/2003 | Brandon et al. |
| 6,808,032 B2 | 10/2004 | Wuertz et al. |
| 7,134,276 B1 | 11/2006 | Langenfeld et al. |
| 7,172,041 B2 | 2/2007 | Wuertz et al. |
| 7,243,746 B1 * | 7/2007 | Vasant ................. B60L 11/18 180/21 |
| 7,503,173 B2 | 3/2009 | Dong et al. |
| 8,094,121 B2 | 1/2012 | Obermeyer et al. |

(Continued)

OTHER PUBLICATIONS

Bobcat Company, "Versatile Compact Track Loader Control," Retrieved from the Internet: <www.bobcat.com/loaders/compacttrack/controls>; Retrieved on Jan. 22, 2015, 3 pp.

*Primary Examiner* — Anshul Sood
(74) *Attorney, Agent, or Firm* — Neal, Gerber & Eisenberg LLP

(57) ABSTRACT

A control system is disclosed for use in a zero turn vehicle, including an electric controller in communication with a pair of independent drive units. A joystick provides user inputs to the controller to control the rotational speed and direction of the drive units. The joystick includes a vertical stalk pivotable between a plurality of pivot positions, where each of the plurality of pivot positions corresponds to a particular rotational speed and direction of each of the driven wheels. A selector switch may be used to select one of a plurality of driving modes stored in the electric controller, wherein each of the plurality of driving modes maps a different set of speeds and directions for each of the driven wheels onto the plurality of pivot positions. The joystick may also rotate about a vertical axis to provide zero turn capability.

22 Claims, 16 Drawing Sheets

(56) References Cited

U.S. PATENT DOCUMENTS

| | | |
|---|---|---|
| 8,607,901 B1 | 12/2013 | Depauw |
| 8,630,770 B2 | 1/2014 | Matsumoto et al. |
| 8,668,036 B2 | 3/2014 | Wyatt et al. |
| D727,904 S | 4/2015 | Jensen |
| 9,114,798 B1 | 8/2015 | Fox et al. |
| 9,266,435 B2 | 2/2016 | Trowell |
| 9,554,683 B2 | 1/2017 | Fellhauer et al. |
| 2003/0029648 A1* | 2/2003 | Trego ............... B62D 51/001 180/19.1 |
| 2003/0114270 A1* | 6/2003 | Wuertz ............. B62D 11/003 477/111 |
| 2006/0065467 A1 | 3/2006 | Schuh |
| 2009/0198414 A1* | 8/2009 | Mohning ............ B60K 6/12 701/41 |
| 2011/0088384 A1* | 4/2011 | Smith ............... B62D 11/003 60/428 |

* cited by examiner

CONTROL SYSTEM FOR A VEHICLE

CROSS REFERENCE

This application is a continuation of U.S. Non-Provisional patent application Ser. No. 14/790,675 filed on Jul. 2, 2015, which claims the benefit of U.S. Provisional Patent App. No. 62/020,612 filed on Jul. 3, 2014. The contents of these prior applications are incorporated herein by reference in their entirety.

BACKGROUND OF THE INVENTION

This disclosure is generally related to drive and directional control devices for vehicles.

This disclosure is generally related to drive and directional control systems for vehicles in general, and more particularly to drive systems and directional control systems for utility vehicles such as, for example, lawn and garden tractors and mowers.

Traditional utility vehicle travel control is accomplished by a combination of driven wheels, steered wheels, a steering control, a transmission control, and a throttle. The operator or user of such a traditional vehicle may first select a forward or reverse gear with the transmission control, then set the throttle to a speed of travel, and then steer the vehicle. This type of vehicle travel control is normally associated with vehicles having a relatively wide turning radius and limited maneuverability in tight quarters.

In an attempt to improve maneuverability, zero turn vehicles, such as zero turn mowers, were introduced. A zero turn style vehicle typically uses independently controlled transaxles or wheel motors to provide steering by selectively speeding up, slowing down, or changing the direction of rotation of the driven wheels on each side of the vehicle. Typically, a user manipulates a pair of levers to control the speed and direction of the output of a transaxle on each side of the vehicle. If the user wishes to move the vehicle forward, he presses both levers forward. If the user wishes to move the vehicle backwards, he pulls the levers back. To steer the vehicle to the left, the right side lever is pushed further than the left, and to execute a very tight turn to the left, the user can pull the left lever back while pressing the right lever forward to execute a zero radius, or near zero radius turn.

The steering wheel method is easy to use but may lack maneuverability and programming flexibility when compared to a joystick control system and the lever activated differential steering systems may simply be more difficult to use for some vehicle operators. This disclosure is directed to addressing the problems and needs of travel control systems in the general area of highly maneuverable utility vehicles.

SUMMARY OF THE INVENTION

The present invention comprises a control system for a utility vehicle capable of traveling in a variety of different directions and turning in a zero turn manner. The control system incorporates a multi-axis user interface such as a joystick connected to a controller for proportionally controlling the direction and speed of the vehicle, and for providing different manners in which the vehicle may enter zero-turn mode. The joystick may include at least one selector switch, such as a pushbutton, for switching between programmed travel modes or selecting an auxiliary function.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

Figure 1:
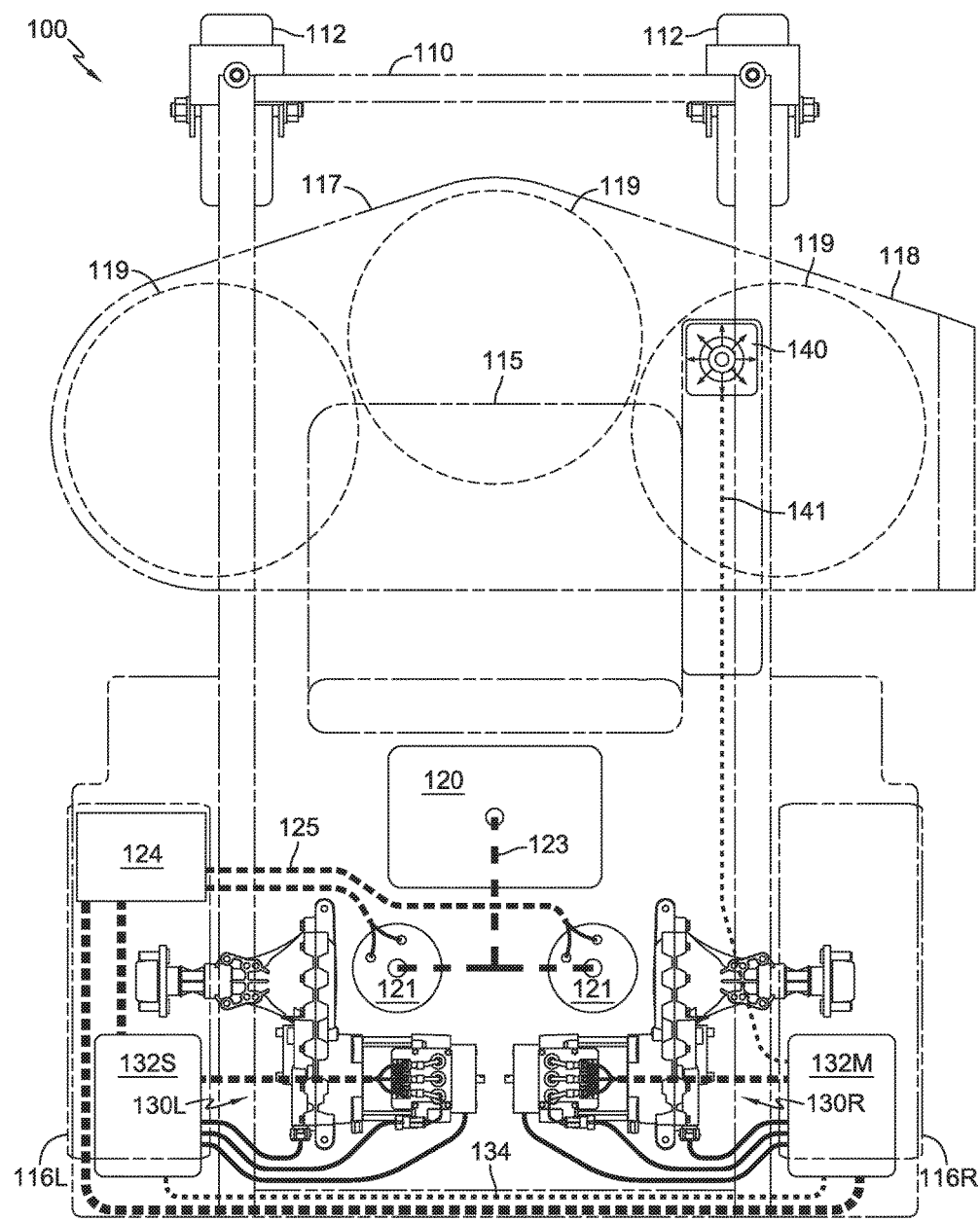
FIG. 1 is a top plan view of a first exemplary vehicle incorporating the control system as disclosed herein.

The description that follows describes, illustrates and exemplifies one or more embodiments of the invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

FIGS. 1, 2, 3, 4, 5 and 6 represent various exemplary vehicles in which the control system of the present invention could be used. FIG. 1 depicts a hybrid zero turn vehicle, namely rear engine rider 100 having a prime mover 120, which could be an internal combustion engine, disposed on frame 110. A pair of electric transaxles 130L and 130R drives a pair of rear wheels 116L and 116R, and a pair of front casters 112 permits zero turn rotation of the vehicle 100. Other standard elements, such as seat 115, deck 117, discharge chute 118 and blades 119, are depicted in a representational manner, as the specifics of these features are not critical to the present disclosure. Prime mover 120 powers a pair of alternators 121 through a standard belt and pulley or other known drive system 123. Alternators 121 in turn charge the battery 124 through conductors 125. It will be understood that battery 124 may be one of various available types and sizes, and may comprise more than one battery unit, depending on the desired power requirements and operating characteristics of the vehicle. Bus 134 connects master controller 132M to slave controller 132S and master controller 132M is connected to joystick 140 by means of conductor 141. It will be understood that joystick 140 could also be wirelessly connected to master controller 132M by known technology and that controllers 132M and 132S could be combined into a single controller.

The electric transaxles 130L and 130R depicted herein may be similar in construction to those depicted in U.S. Pat. No. 8,668,036, the terms of which are incorporated herein by reference. It will be understood that those elements of the vehicle which are important to the ability of the user to turn the vehicle, such as the electric transaxles 130L and 130R, are designated using left and right designations, simply for ease of description. Other elements which may have more than one component such as the alternators 121, but for whom location is not critical, do not use left and right designations.

Additional types of utility vehicles 200, 300, 400, 500 and 600 are depicted in FIGS. 2, 3, 4, 5 and 6, respectively, and are described below. Many aspects of these vehicles 200, 300, 400, 500 and 600 are similar to those in vehicle 100, such as frame 210, 310, 410, 510, 610, casters 212, 312, 412, 512 and 612 and the like, and these elements may be depicted in the figures but will not be discussed in any detail, as the structure and operation of such elements can be substantially similar between embodiments. Joystick 140, which is described in more detail below, is depicted as being the same in each of the vehicle embodiments.

Figure 2:
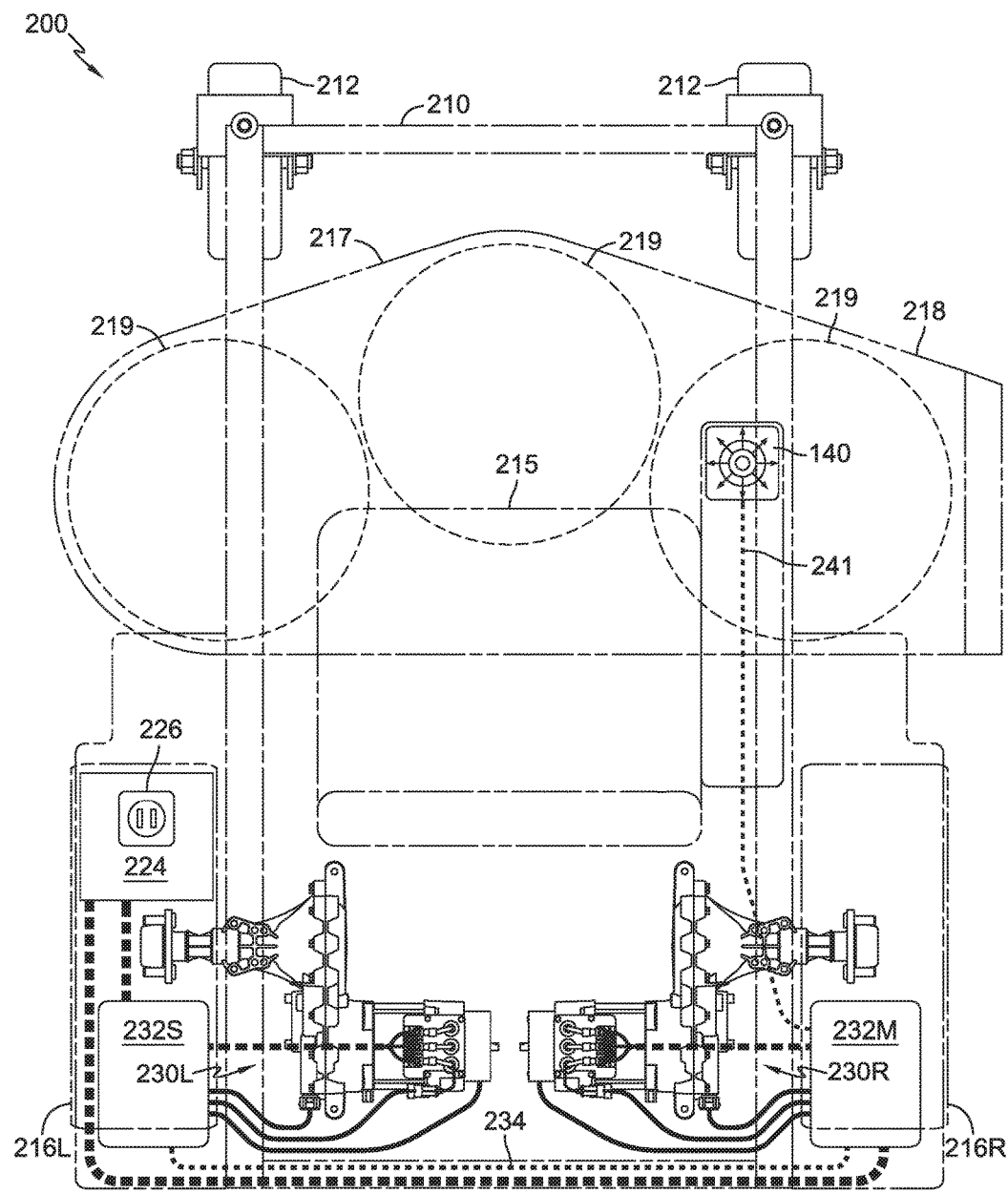
FIG. 2 is a top plan view of a second exemplary vehicle incorporating the control system as disclosed herein.

FIG. 2 depicts an all-electric vehicle 200 which is similar in many respects to vehicle 100, with the primary difference being the use of battery 224 to power the electric transaxles 230L, 230R, and mower blades 219 without the need for a separate engine. Bus 234 connects controllers 232M and 232S and master controller 232M is connected to joystick 140. A charge receptacle 226 for battery 224 is also depicted.

Figure 3:
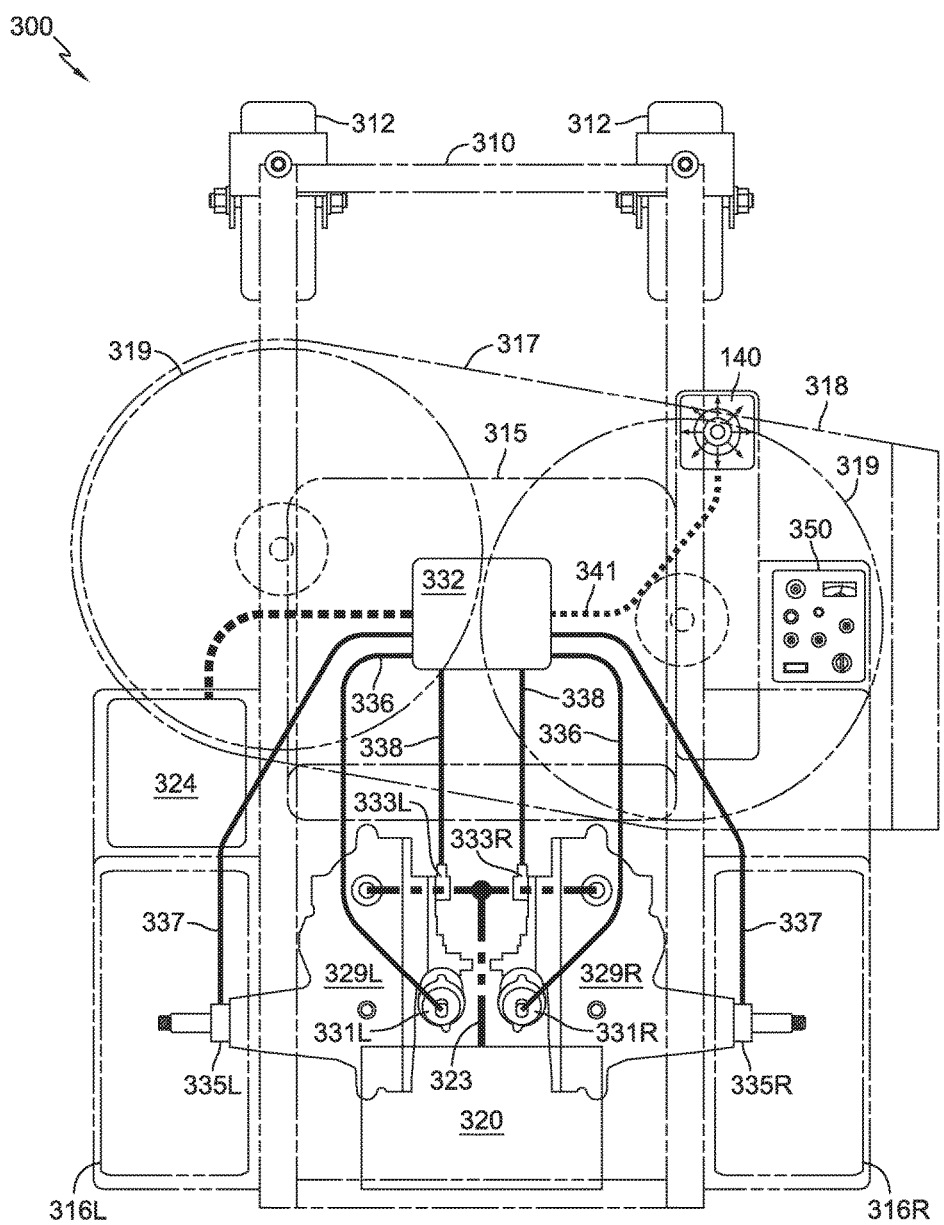
FIG. 3 is a top plan view of a third exemplary vehicle incorporating the control system as disclosed herein.

FIG. 3 depicts another exemplary vehicle 300 having a pair of hydrostatic transaxles 329L, 329R driving rear wheels 316L, 316R. Prime mover 320 drives the transaxles 329R and 329L by means of a standard drive/pulley system 323.

Controller 332 is depicted as being centrally located under seat 315, but the location of this component and others, such as battery 324, can be modified and are dependent on the vehicle size and other factors. A control panel 350 provides the operator with control of certain vehicle functions and information about the status of vehicle 300. It will be understood that an operator interface, such as control panel 350, may be provided in addition to joystick 140 for any of the vehicles described herein, although this additional operator interface is not shown in order to simplify the other vehicle figures.

Controller 332 receives power from battery 324 and is connected to joystick 140 by conductor 341. Electric displacement actuators 331L, 331R control the output of transaxles 329L, 329R, respectively, based on input from controller 332, and are connected thereto by means of conductors 336. Sensors 333L, 333R also provide controller 332 with information about the position of the swash plates (not shown) inside transaxles 329L, 329R and are connected to controller 332 by means of conductors 338. Speed sensors 335L, 335R are used to indicate the actual speed of rear driven wheels 316L, 316R, and are connected to controller 332 by means of conductors 337. Electric displacement actuators 331L, 331R may be similar to those depicted in U.S. patent application Ser. No. 14/104,979, the terms of which are incorporated herein by reference. Transaxles 329R and 329L may be Hydro-Gear ZT-2800 integrated zero-turn transaxles, as depicted in U.S. Pat. No. 7,134,276, the terms of which are incorporated herein by reference. Electric displacement actuators 331L and 331R are shown as being integral to transaxles 329L, 329R but they could also be separately connected thereto.

Figure 4:
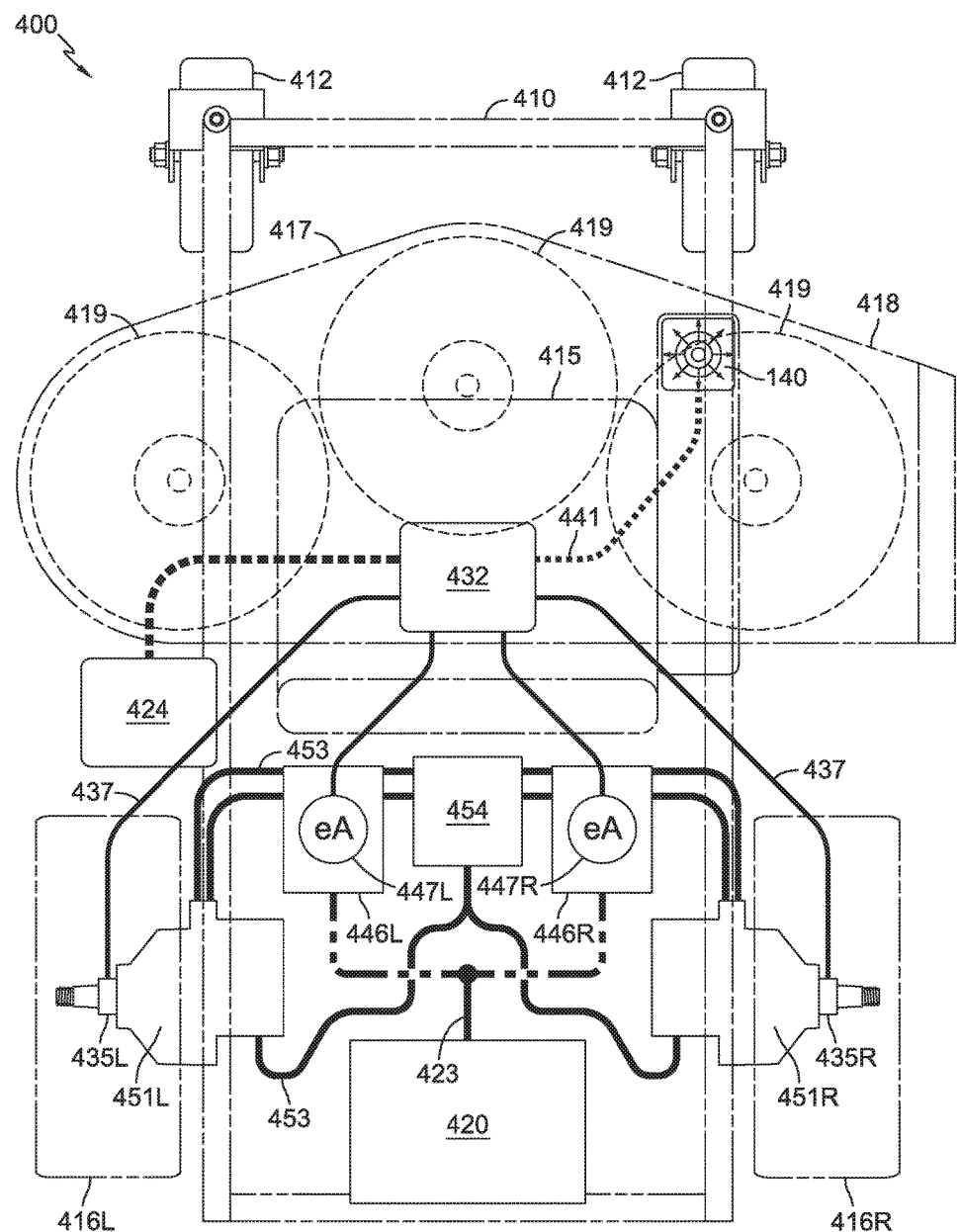
FIG. 4 is a top plan view of a fourth exemplary vehicle incorporating the control system as disclosed herein.

FIG. 4 represents another hybrid vehicle 400 using prime mover 420 to power a pair of separate hydraulic pumps 446L, 446R, each with its own electric actuator 447L, 447R (designated as "eA" in the drawing), to drive rear wheels 416L, 416R, respectively. Single controller 432 is connected to battery 424, speed sensors 435L and 435R, electric actuators 447L and 447R, and joystick 140 in a manner similar to that described above. Standard hydraulic lines 453 are used to connect pump 446L to motor 451L, pump 446R to motor 451R, and all of the foregoing to reservoir 454.

It will be understood that the depiction of the batteries 124, 224, 324, 424, 524 and 624 in FIGS. 1-4, 5 and 6 is representational, and that in each vehicle more than one battery may be used. For example, in FIG. 1, battery 124 could be four 12-volt batteries with each alternator 121 charging a pair of the batteries.

Figure 5:
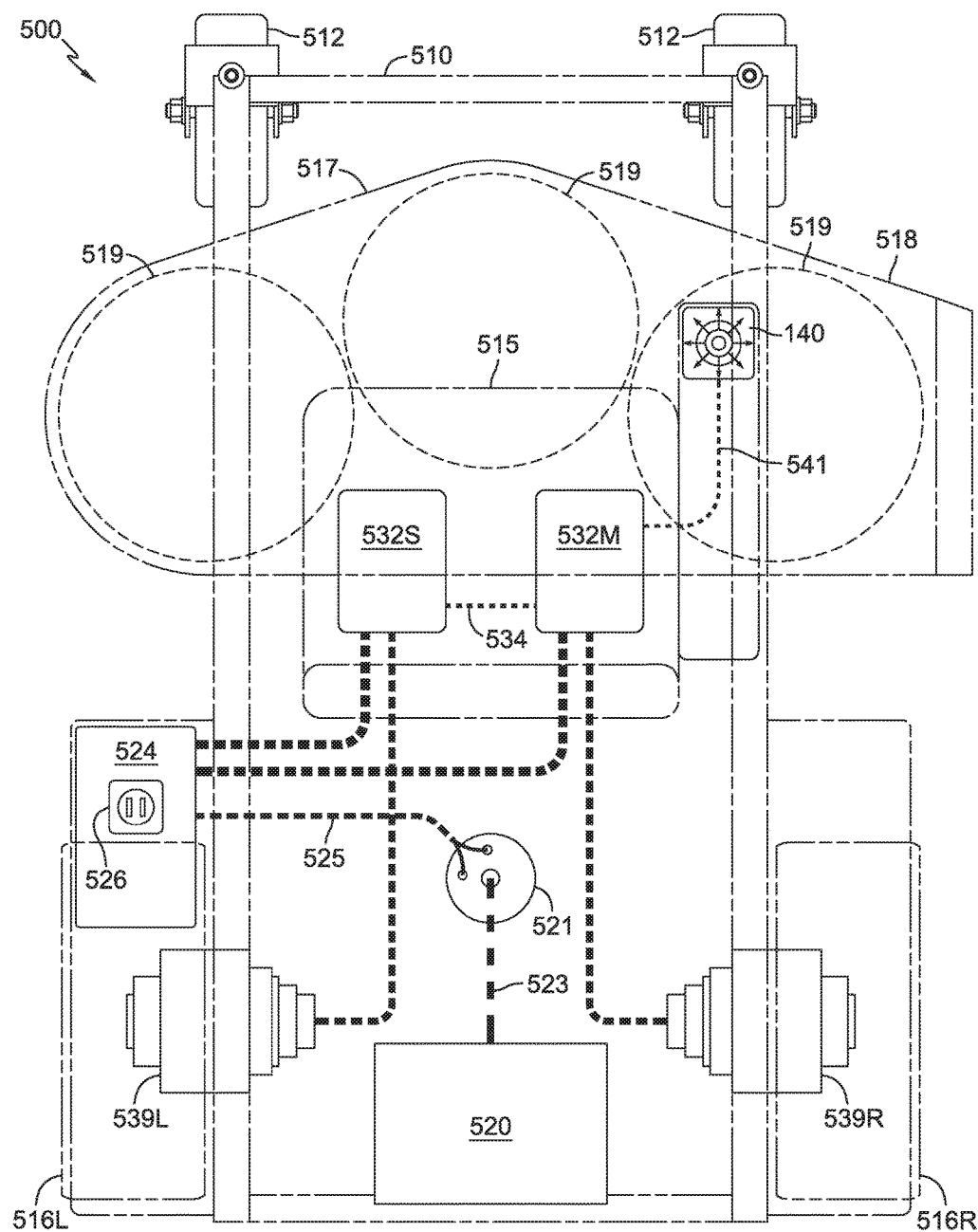
FIG. 5 is a top plan view of a fifth exemplary vehicle incorporating the control system as disclosed herein.

The joystick controller assembly disclosed herein could also be used in a vehicle incorporating electric wheel hub motors. For example, FIG. 5 represents a vehicle 500 incorporating a pair of wheel hub motors 539L and 539R on which the wheels 516L and 516R, respectively, are mounted.

Vehicle 500 is similar in many respects to vehicle 100, with similarly numbered elements being the same as or similar to those previously discussed. As can be seen, certain elements such as controllers 532S and 532M and prime mover 520 are disposed in a different location than in prior embodiments, demonstrating the flexibility of the design. As before, joystick 140 is connected to master controller 532M, and the two controllers 532M and 532S are connected by bus 534 and are also connected to the separate wheel hub motors 539R and 539L, respectively. Prime mover 520 powers a single alternator 521, which powers the battery 524.

Figure 6:
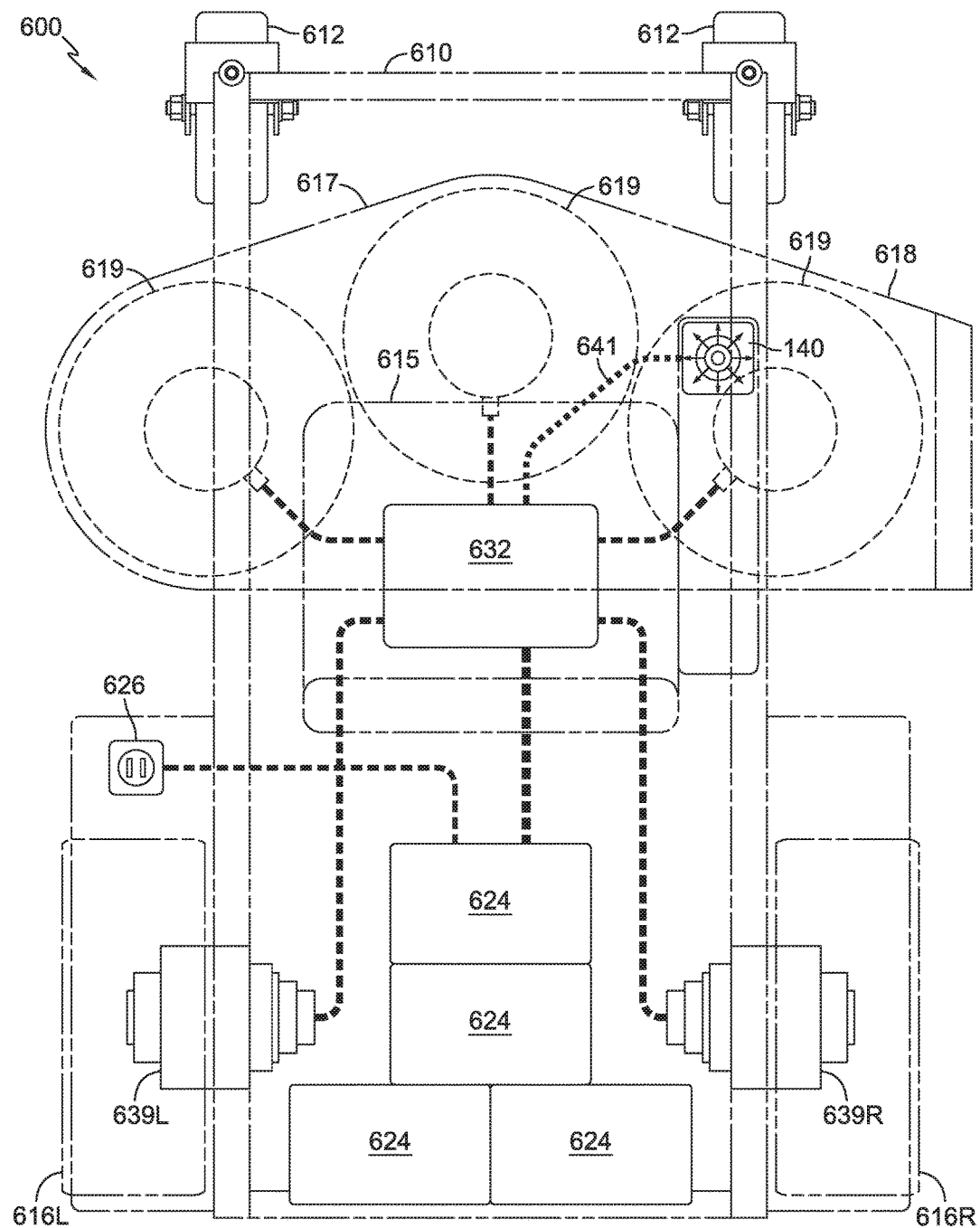
FIG. 6 is a top plan view of a sixth exemplary vehicle incorporating the control system as disclosed herein.

FIG. 6 represents another vehicle 600 incorporating wheel hub motors 639L, 639R, which can be the same as those previously described. This embodiment is an all-electric vehicle similar in many respects to that depicted in FIG. 2 and, while similarly numbered elements are again the same or substantially the same as those in other embodiments, this figure depicts additional flexibility of the design including, for example, the mounting of multiple batteries 624 and the connection of these batteries 624 to the wheel hub motors 639L and 639R by way of a controller 632 that also controls an electric mowing deck 617. A charge receptacle 626 is also provided.

Figure 7:
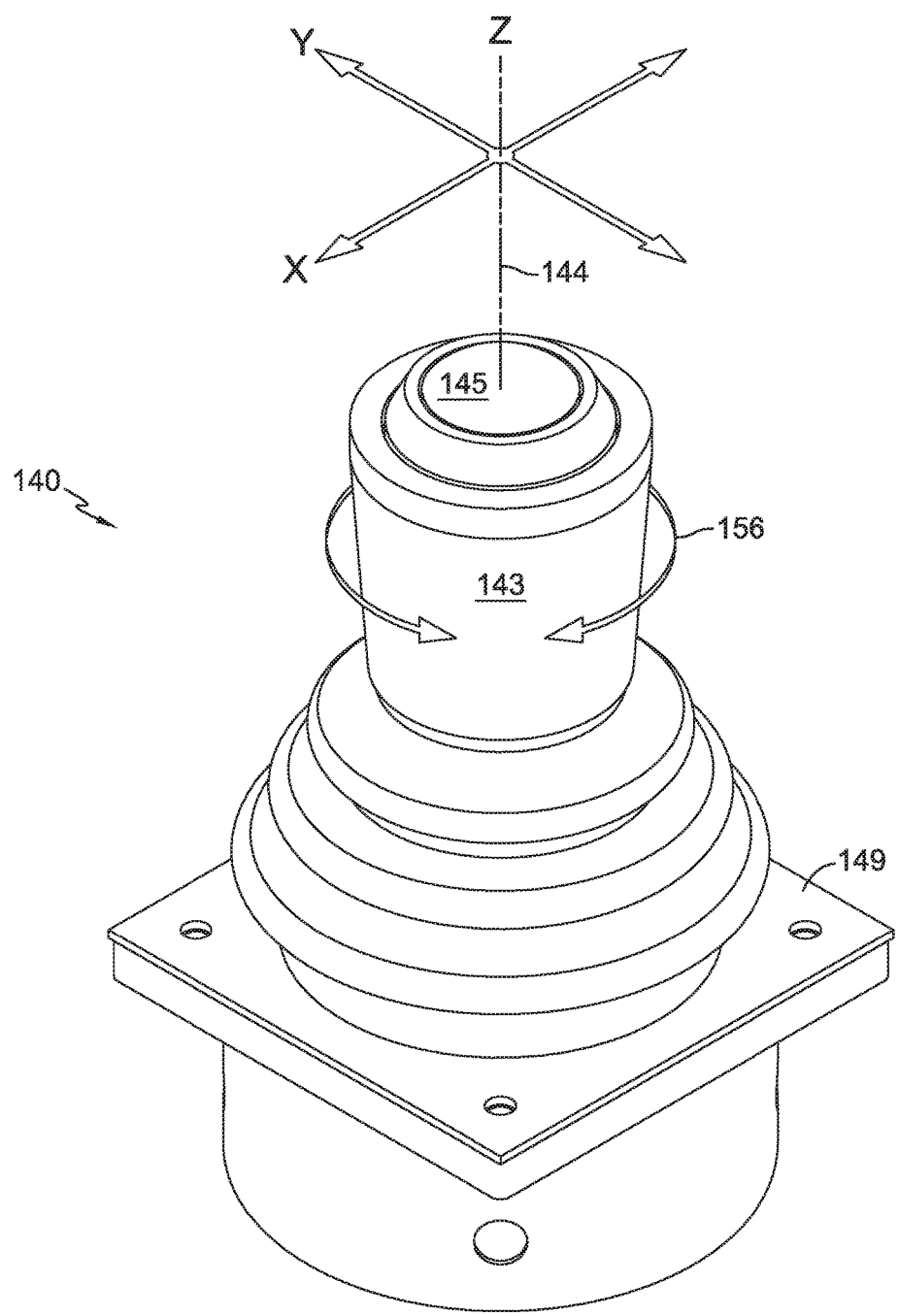
FIG. 7 is a perspective view of a joystick-style input device in accordance with the present invention.

Joystick 140, which is depicted as being the same in each of the vehicle embodiments, is shown in more detail in FIG. 7, and can be similar in many respects to a standard joystick. It comprises a base 149 to connect to the vehicle in a known manner. A vertical stalk or stick 143 pivots about a pivot point at its base in all directions akin to a standard joystick, as shown by the X and Y axes in FIG. 7, creating a plurality of pivot positions that can be communicated to the controller of a vehicle, such as controller 332. As shown by arrows 156, stick 143 may also rotate about a vertical axis 144 (i.e., the Z axis), creating a plurality of rotational positions that can be communicated to the controller of a vehicle, such as controller 332. Pushbutton 145 may be used as a selector switch to provide additional functionality, as described below.

FIGS. 8-19 are representational figures depicting various possibilities for operating the vehicles depicted herein. FIGS. 8, 11, 14 and 17 are similar depictions of sixteen possible positions 1 through 16 of joystick 140; it will be understood that joystick 140 is infinitely variable, so these specific positions are merely representative of selected positions for purposes of understanding the different programming options available with this system. The following disclosure references vehicle 300 of FIG. 3 and the elements thereof merely for convenience of description, as it would apply to the other vehicles disclosed herein and other embodiments.

Figure 8:
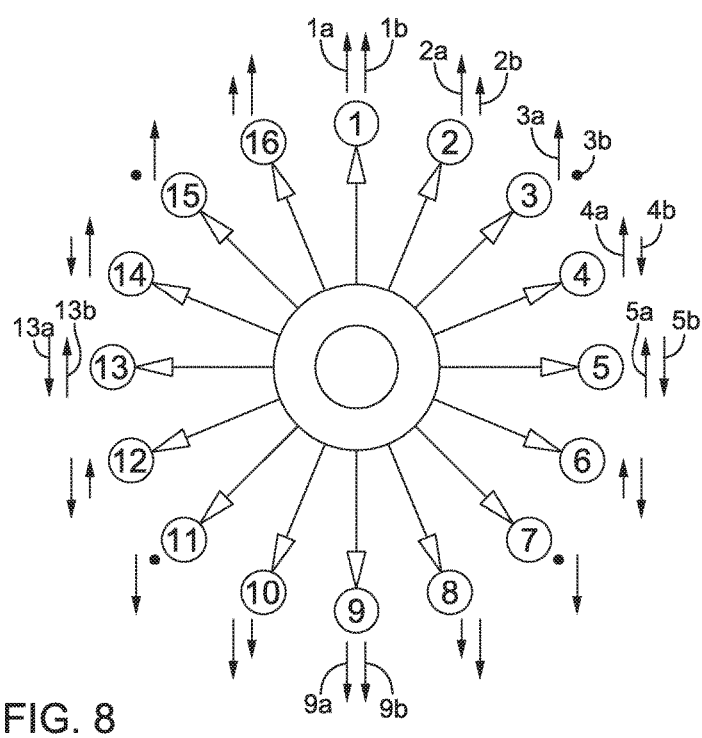
FIG. 8 is a representation of certain possible drive positions of the joystick of the present invention, without any additional programming to control or modulate the vehicle output.
Figure 9:
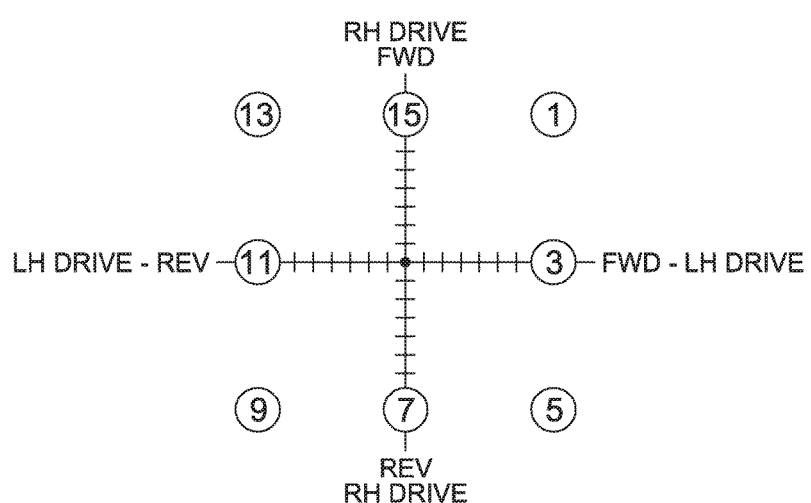
FIG. 9 is a graph of the drive outputs corresponding to the positions of the joystick depicted in FIG. 8.
Figure 10:
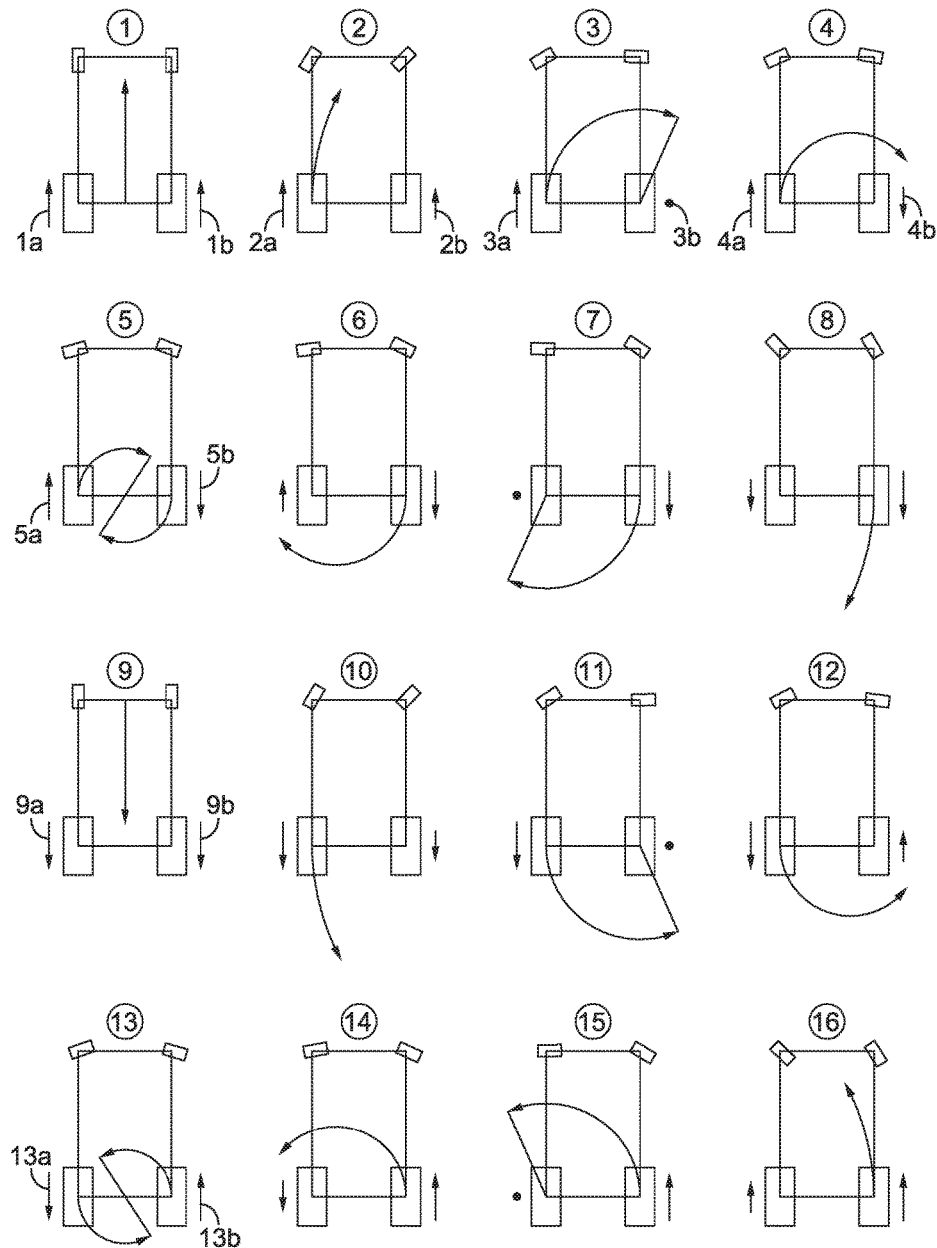
FIG. 10 is a representation of the vehicle movements corresponding to the positions of the joystick depicted in FIG. 8.

FIGS. 8, 9 and 10 depict a first driving mode, and specifically one with no separate controls or limitations on the operation of the vehicle. In FIG. 8, the arrows next to the position numbers depict the relative speeds of the left driven wheel 316L and right driven wheel 316R of zero turn vehicle 300. Position 1 depicts both driven wheels 316L, 316R moving forward at full speed, so arrows 1a and 1b are of equal length. It will be understood that as the joystick moves from the zero-zero position out to each position 1 through 16 along the vectors shown in FIG. 8, the speeds of the left and right wheels will vary but will remain at a relative difference with respect to one another (or at no relative difference, e.g., at positions 1 and 9). This applies to the other driving modes depicted in later figures as well. In the graph of FIG. 9, the horizontal axis represents the rotational speed and direction of the left drive 329L output and associated left driven wheel 316L, whereas the vertical axis represents the rotational speed and direction of the right drive 329R output and associated right driven wheel 316R. Thus, position 1 similarly shows right driven wheel 316R rotating forward at full speed, while left driven wheel 316L is also rotating forward at full speed, meaning that vehicle 300 is operating at its full forward speed.

Similarly, position 9 in FIG. 8 shows arrows 9a and 9b in full reverse; this position represents joystick 140 being pulled all the way back, such that both driven wheels 316L, 316R are at full speed in the reverse direction, moving the vehicle 300 backwards at full speed, as represented at position 9 in FIG. 9.

Position 2 shows both driven wheels moving forward, but with left driven wheel 316L turning faster than right driven wheel 316R, resulting in a relatively gentle turn to the right, as seen in FIG. 10. Arrow 2a is thus longer than arrow 2b and represents a greater speed for left driven wheel 316L than for right driven wheel 316R. Position 3 shows left driven wheel 316L moving at full speed forward, as shown by arrow 3a, while right driven wheel 316R is stopped, shown by the dot at 3b in FIG. 8. This represents a sharp turn of vehicle 300 to the right, as depicted by position 3 in FIG. 10.

As joystick 140 is pivoted, or canted, further to the right, it will reach position 4 where right driven wheel 316R is now moving in reverse at a reduced speed (arrow 4b) and left driven wheel 316L is still moving forward at full speed (arrow 4a), resulting in an even more dramatic right hand turn, as shown in FIG. 10. When joystick 140 is pivoted to position 5, the two driven wheels 316L and 316R are moving at the same speed, but in opposite directions, resulting in a true zero turn operation. This is represented by arrows 5a and 5b being the same length.

It will be understood that operation in the different quadrants depicted in FIG. 9 will move the vehicle 300 in the same manner, but in different directions. That is, moving the joystick 140 from position 1 to 16 to 15 to 14 to 13 will result in a left turn of vehicle 300 that becomes gradually sharper until vehicle 300 is performing a zero turn operation to the left.

Similarly, as the joystick 140 then continues to move in the counter-clockwise direction from position 13 to position 9, the vehicle will leave the left zero turn mode of position 13 and begin backing up, with the rear of the vehicle 300 moving to the right, as shown, e.g., by positions 12, 11 and 10 in FIG. 10, until the vehicle is moving in reverse.

Figure 11:
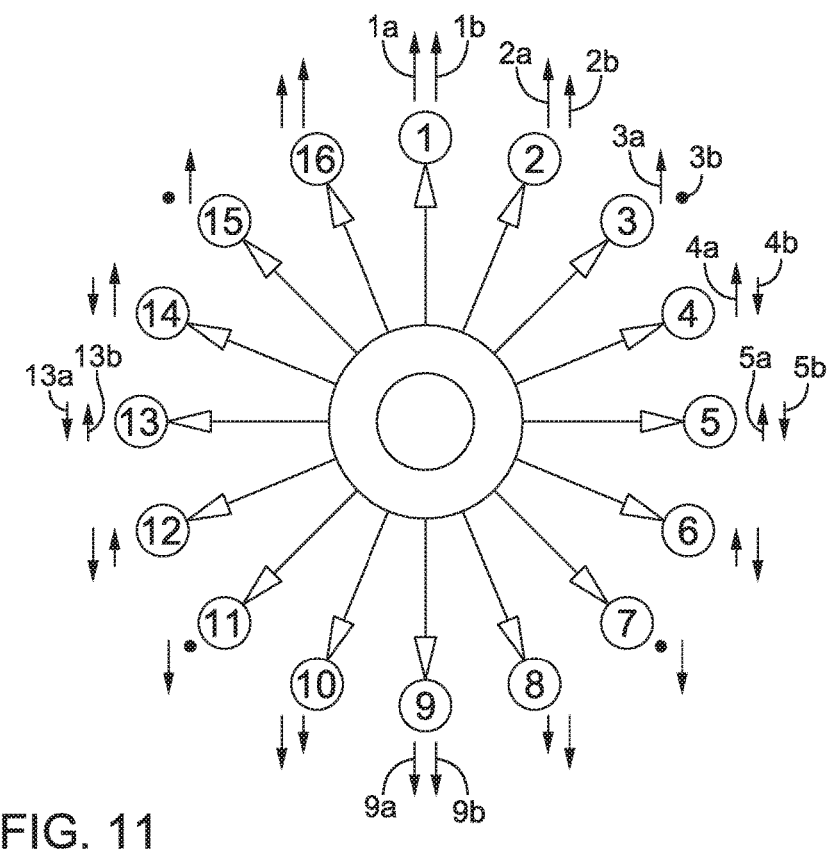
FIG. 11 is a representation of certain possible drive positions of the joystick of the present invention, using a first set of instructions for controlling and modulating the vehicle output.
Figure 12:
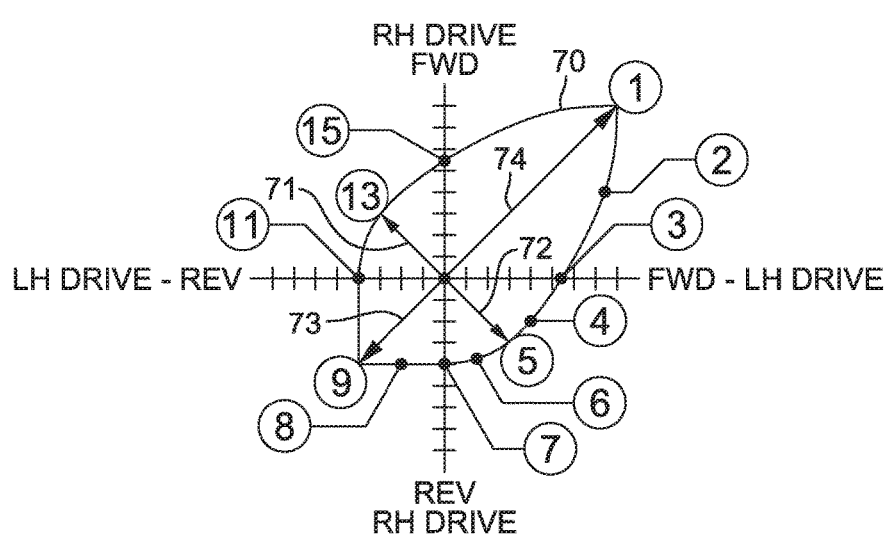
FIG. 12 is a graph of the drive outputs corresponding to the positions of the joystick depicted in FIG. 11.
Figure 13:
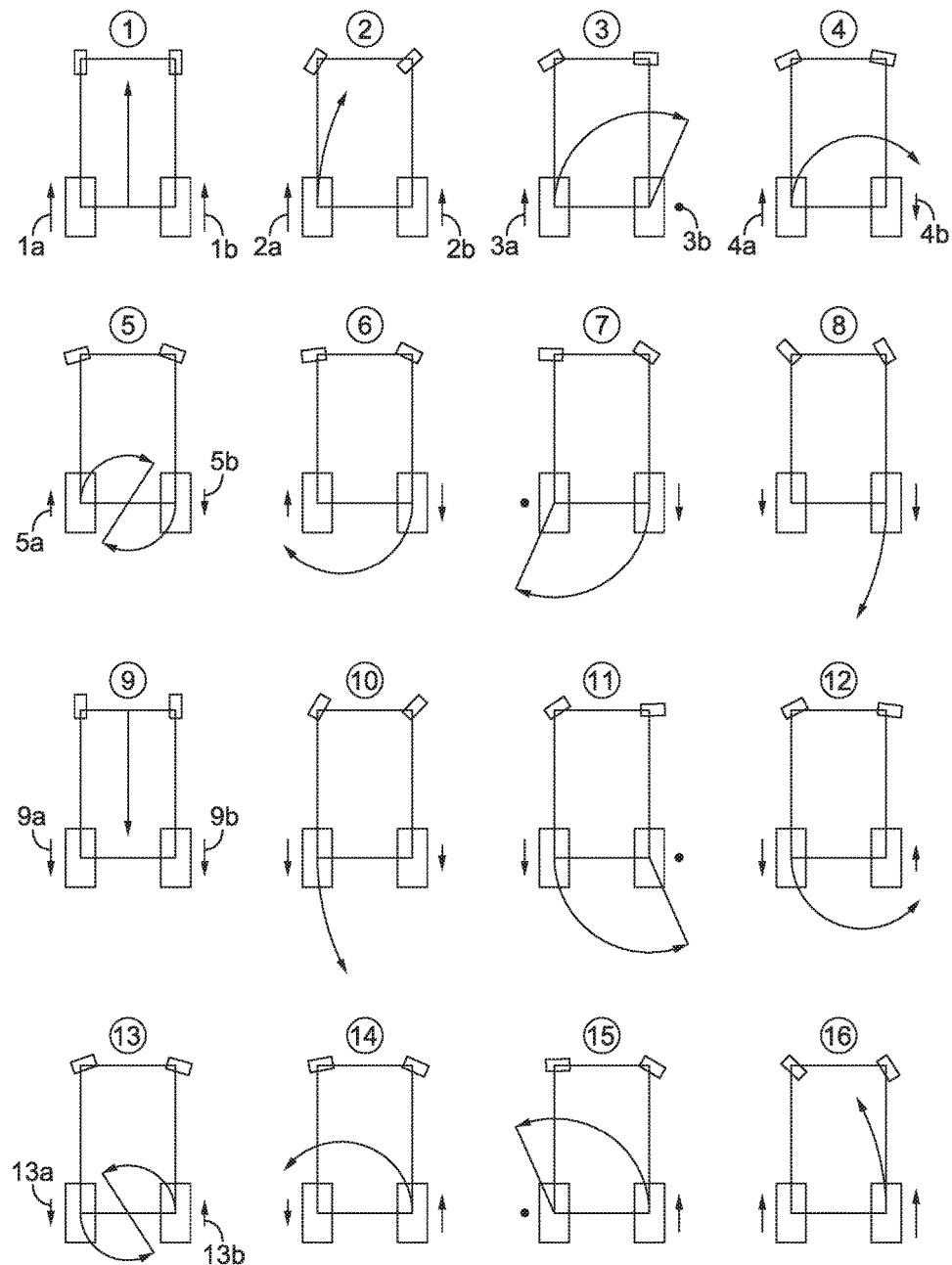
FIG. 13 is a representation of the vehicle movements corresponding to the positions of the joystick depicted in FIG. 11.

FIGS. 11, 12 and 13 are similar to those above, but depict a different driving mode, specifically one for vehicle 300 with a speed control function added to the controller 332. The shorter arrows 5a, 5b and 13a, 13b in FIG. 11 adjacent to positions 5 and 13 show that the controller 332 limits the speed of driven wheels 316L and 316R during zero turn operations. This limitation can be particularly important for safety and ease of operation, to prevent vehicle 300 from being thrown into a full speed zero turn operation at high speed.

Note also that in FIG. 11, the arrows 9a and 9b adjacent position 9 are also shorter than the arrows 1a and 1b adjacent position 1, demonstrating a speed limit on full reverse speed. The shape 70 in FIG. 12 depicts the range of speeds and motion permitted by the controller while the profile or outer boundary of shape 70 represents the maximum operating conditions allowed by the controller 332 programming. Axes 71 and 72 represent the reduced range of speed at zero turn positions 5 and 13, while axis 73 represents the reduced range of speed at full reverse position 9, and axis 74 represents the full forward speed at position 1. The curves connecting these positions create the boundary of shape 70, where the vehicle 300 may operate at any point on or inside this boundary defining shape 70.

Figure 14:
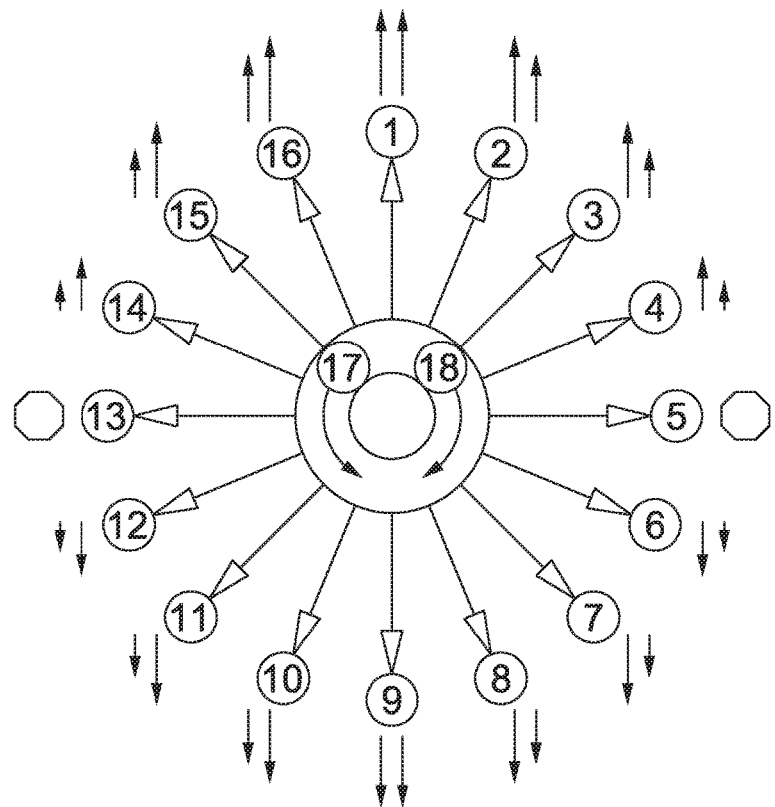
FIG. 14 is a representation of certain possible drive positions of the joystick of the present invention, using a second set of instructions for controlling and modulating the vehicle output.
Figure 17:
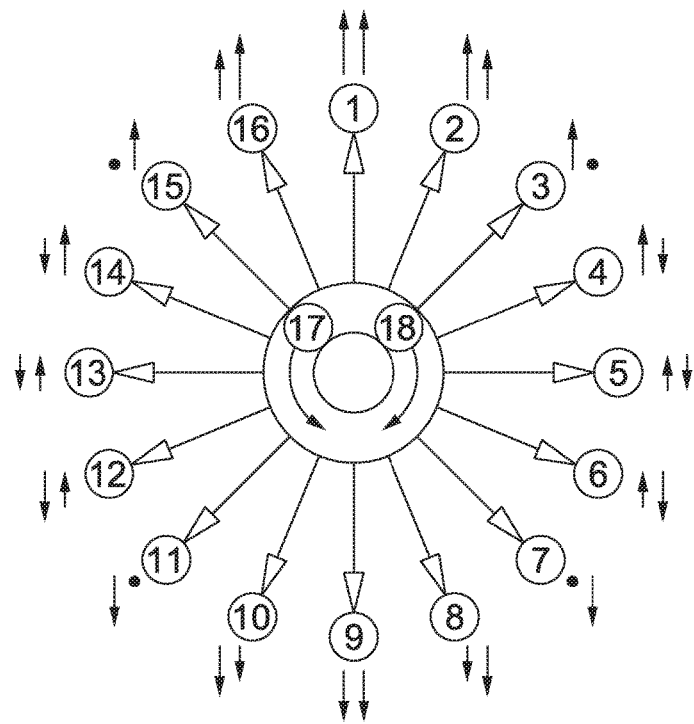
FIG. 17 is a representation of certain possible drive positions of the joystick of the present invention, using a third set of instructions for controlling and modulating the vehicle output.

The user could alternate between the programming scheme, or driving modes, of FIGS. 11, 14 and 17 by use of pushbutton 145. For example, the system could be programmed such that the scheme of FIG. 11 is the default, and activation of pushbutton 145 provides the twist to zero-turn capability of FIG. 14. Control panel 350 may be used to require further operator input to prevent unintentional switching between travel mode programs; e.g., an operator of vehicle 300 may be required to press a button or activate a switch of control panel 350 in addition to pressing pushbutton 145 in order to select a different travel mode. Further programming parameters may also require vehicle 300 to be stopped or in a neutral drive state to select a different travel mode.

Figure 15:
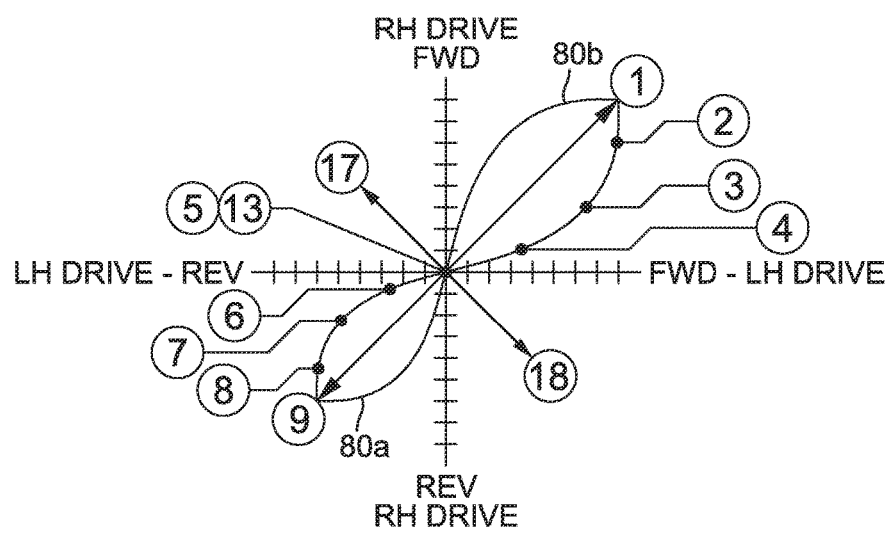
FIG. 15 is a graph of the drive outputs corresponding to the positions of the joystick depicted in FIG. 14.
Figure 16:
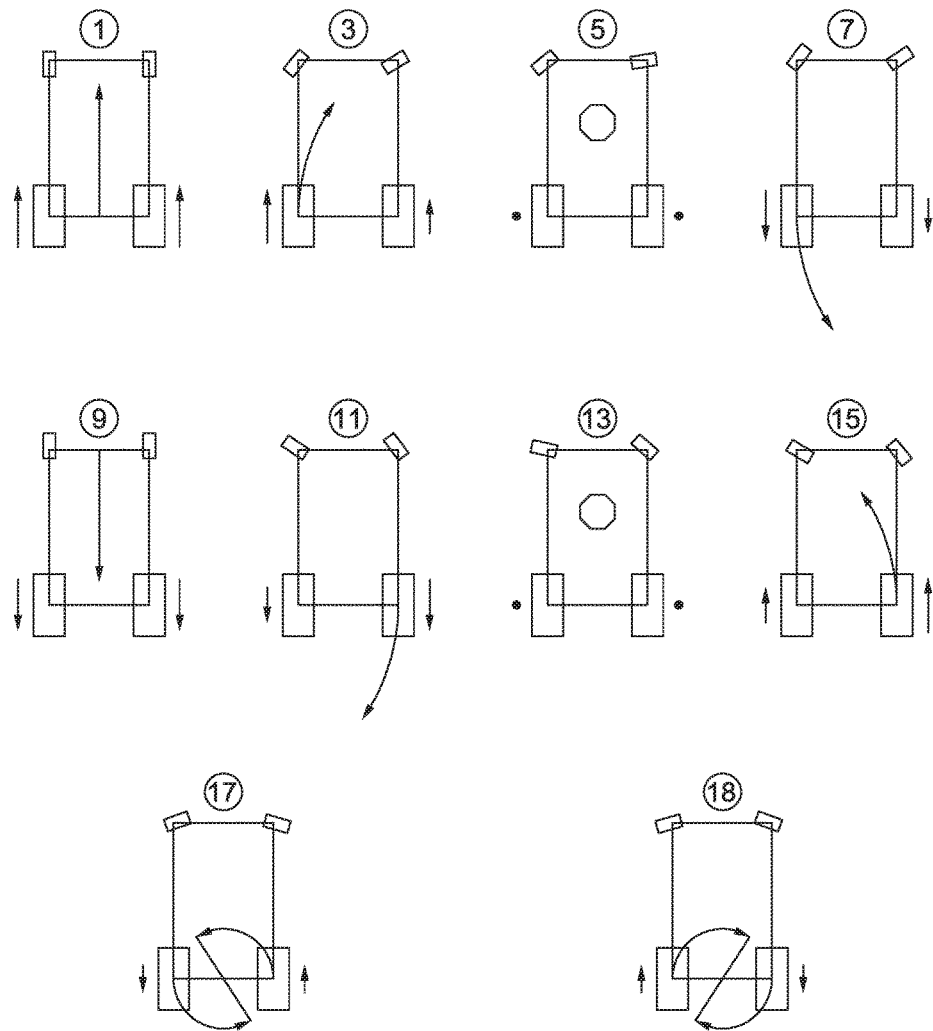
FIG. 16 is a representation of the vehicle movements corresponding to the positions of the joystick depicted in FIG. 14.

FIGS. 14, 15 and 16 are a set of drawings similar to the FIGS. 11, 12 and 13, but representing a different set of programming for controller 332 and thus a different driving mode. In this embodiment, joystick 140 now includes a twist component, which permits the user to enter zero turn by rotating or twisting the stick 143 about its vertical axis 144. Rotation in the clockwise direction, denoted by arrow/position 18, results in vehicle 300 making a zero turn in the clockwise direction. Similarly, rotation in the counter-clockwise direction, denoted by arrow/position 17, results in vehicle 300 making a zero turn in the counter-clockwise direction. The degree of twist applied to stick 143 by the vehicle operator determines the speed of the zero turn. Each of the plurality of driving modes maps a different set of speeds and directions for each of the driven wheels onto the plurality of rotational positions (e.g., the driving modes of FIGS. 14, 17, and 20), including some driving modes where the rotational positions are disabled (e.g., the driving modes of FIGS. 8 and 11). Controller 332 is also programmable such that movement of the joystick to the full left position 13 or the full right position 5 results in the vehicle stopping, instead of performing the zero turn operation as in the prior embodiments, as shown at positions 5 and 13 in FIG. 14. The range of possible speed and direction combinations of vehicle 300, as depicted by shapes 80*a* and 80*b* in the graph of FIG. 15, is more limited than in the prior embodiment, and shape 80*a* is smaller than shape 80*b* due to the reduced reverse speed being programmed in this embodiment. Vehicle 300 may be operated at any of the speed and direction combinations located on or inside the boundaries of the two shapes 80*a* and 80*b* of FIG. 15, plus anywhere along the diagonal axis connecting the two zero turn maximum speed positions 17 and 18 which are located outside shapes 80*a* and 80*b*.

Each of the plurality of driving modes maps a different set of speeds and directions for each of the driven wheels onto the plurality of pivot positions. A further advantage of the driving mode depicted in FIG. 14 is that it may be considered more intuitive than the driving modes in, e.g., FIGS. 8 and 11. Specifically, in the modes shown in FIGS. 8 and 11, when the joystick is pivoted or canted to a position to the back and right with respect to the user (e.g., positions 6, 7 or 8) the vehicle will move in reverse, to the left (i.e., to the opposite side as the user may expect). On the other hand, in the driving mode shown in FIG. 14, when the joystick is pivoted to a position to the back and right with respect to the user (e.g., positions 6, 7 or 8) the vehicle will move in reverse, to the right (i.e., in the direction that the user may expect). Similar differences are shown when the joystick is pivoted to the back and the left with respect to the user (e.g., positions 10, 11 and 12).

Figure 20:
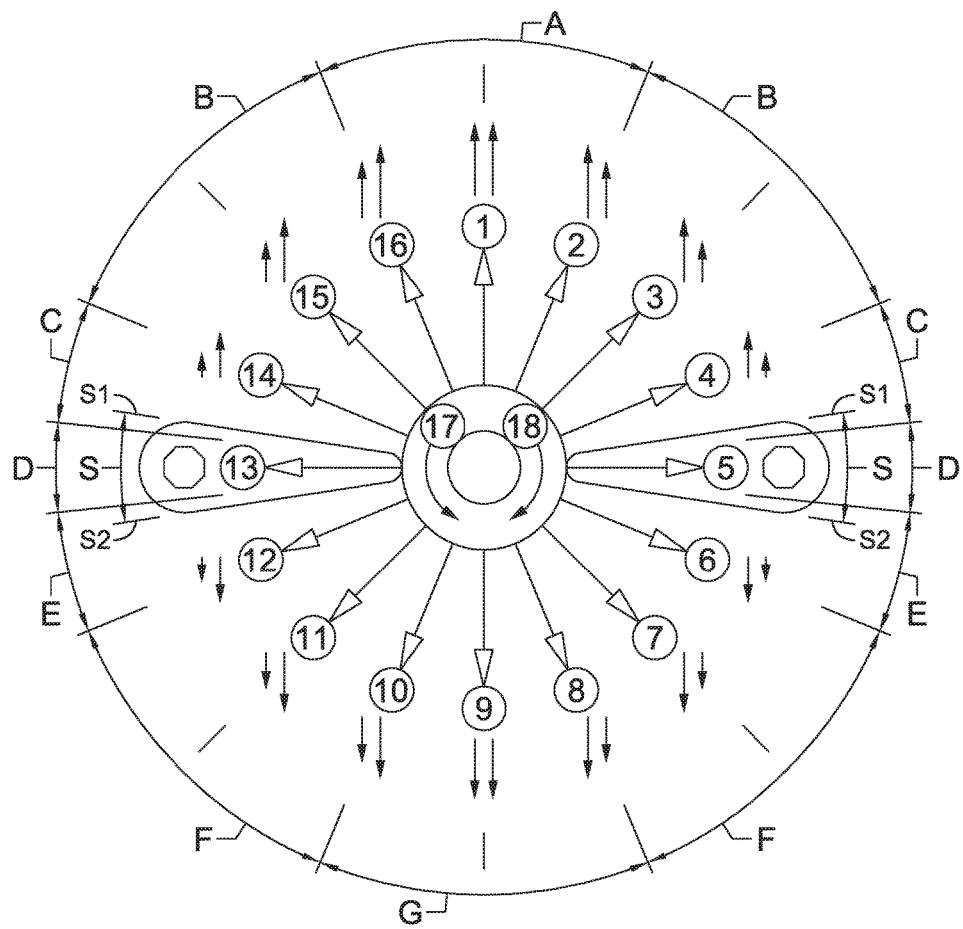
FIG. 20 is a representation of the possible drive positions of the joystick of the present invention, using the second set of instructions for controlling and modulating the vehicle output as depicted in FIG. 14 but also incorporating physical stops for the joystick.

A potential drawback of the driving modes which incorporate stop positions 5 and 13 is that a user driving vehicle 300 in a tight left or right turn, such as one mowing a tight circle around an object, could inadvertently move the joystick to the stopped positions 5 or 13. This may cause aggravation and delay in completing the job. To address this concern, FIG. 20 represents another programming modification for controller 332, and a physical modification of joystick 140, whereby elements S-1 and S-2 represent physical stops restricting the movement of joystick 140 to restrict or prevent it from moving into a stopped position from either the forward or reverse directions. This permits vehicle 300 to have a minimum turning radius determined by the vehicle parameters, so that the user can fully pivot the joystick 140 in the desired direction without concern that the vehicle will hit the stopped position. FIG. 20 is otherwise similar to FIG. 14, with the positions 1 through 16 representing the same joystick positions and corresponding vehicle movement, while arrows/positions 17 and 18 represent the twist-to-zero-turn mode of operation. This figure also depicts various sectors A through G, with sector A representing full forward speed being allowed while traveling straight or in a wide turn. The two sectors B represent positions where forward speed is reduced as the vehicle 300 turns left or right in a tighter turn. This reduction is preferably programmed as a gradual speed reduction as the vehicle moves into a progressively tighter turn. Sectors C represent positions where the maximum reduction is applied to forward speeds while in very tight turns, prior to hitting either of the stops S-1. Similarly, sector G represents full reverse speed being allowed while traveling straight or in a wide turn. Sectors F represent positions where reverse speed is reduced as the vehicle 300 turns left or right in a tighter turn. This reduction is also preferably programmed as a gradual speed reduction as the vehicle moves into a progressively tighter turn. Sector E represents positions where the maximum reduction is applied to reverse speeds while in very tight turns, prior to hitting either of the stops S-2. Sectors D represent a programmed stop function if the joystick 140 reaches positions 5 or 13. This is provided as a fail-safe feature in the event either of the stops S-1 or S-2 are defeated or fail for any reason. The physical stop sectors S are bounded by stops S1, S2 and overlap the programmed stop sectors D. The joystick may ride along the stops S1 and S2 to aid the vehicle operator in controlling a tight turn within an allowed speed range. The size of the various sectors shown in FIG. 20 is exemplary and may be determined by the programmer to provide appropriate responses of a particular vehicle.

Figure 18:
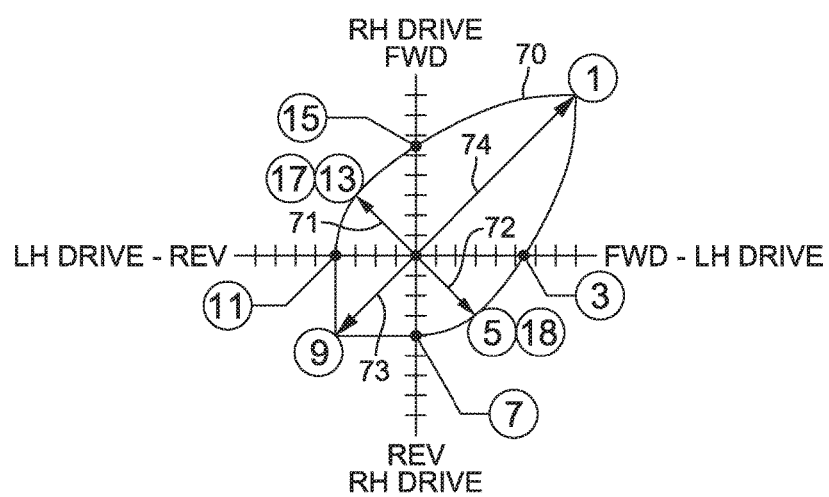
FIG. 18 is a graph of the drive outputs corresponding to the positions of the joystick depicted in FIG. 17.
Figure 19:
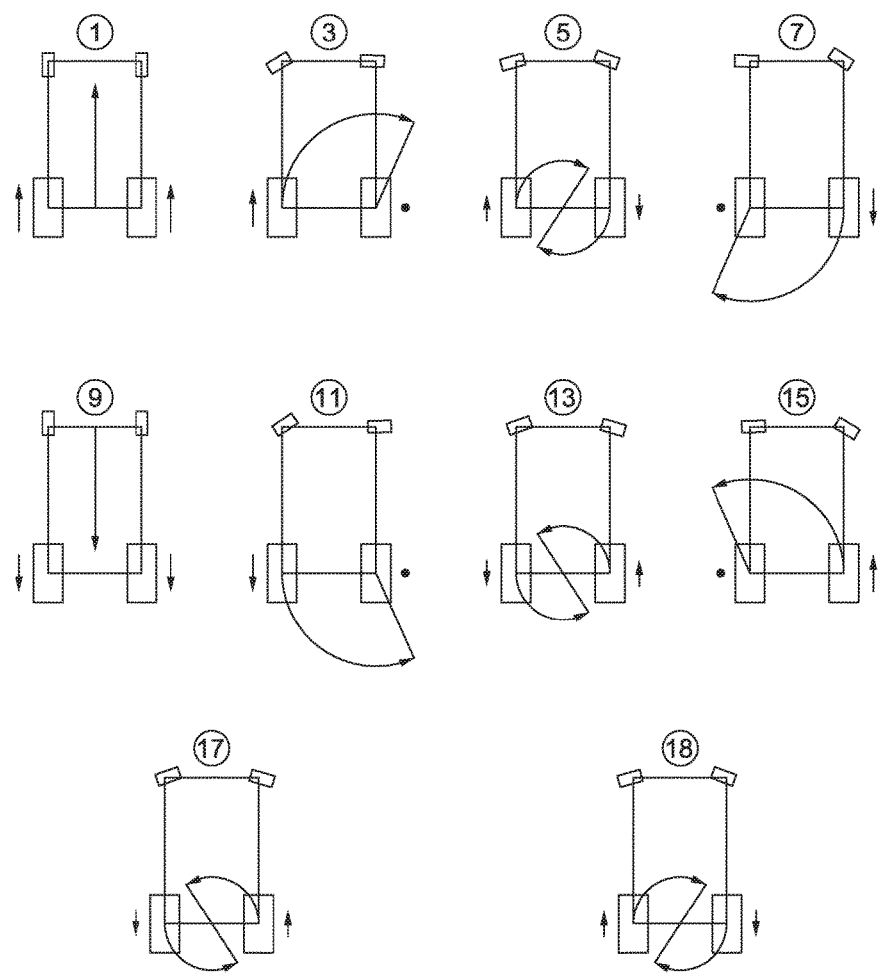
FIG. 19 is a representation of the vehicle movements corresponding to the positions of the joystick depicted in FIG. 17.

FIGS. 17, 18 and 19 are another set of figures similar to the prior views of FIGS. 11-16, and depict a system where the programming of controller 332 is a combination of the prior two embodiments. That is, zero turn to the right may be accomplished by pivoting the joystick to position 5 or by twisting it in the clockwise direction as denoted by position 18, and zero turn to the left may be accomplished by pivoting the joystick 140 to position 13 or by rotating it in a counterclockwise direction as denoted by position 17. The allowed zero turn speed range may be programmed to be different depending on whether the zero turn travel mode is initiated by pivoting or twisting of joystick 140. Programming may also ensure that one of the two zero turn travel modes can only be entered by twisting of joystick 140 when it is in the neutral position. Shape 70 in FIG. 18 again represents the permissible range of vehicle speeds and directions. As noted above, for all embodiments, the references to controller 332 and vehicle 300 are exemplary only, as this invention can be used with the other vehicles depicted and other utility vehicles where this type of zero turn operation and control is desirable.

The "twist" feature of joystick 140 could also be used in different manners, in addition to the twist-to-zero-turn embodiments previously described, and various modifications may be programmed into the controller. For example, the twist capability depicted in FIG. 14 as positions 17 and 18 corresponding to zero turn for the vehicle could be limited to situations where stick 143 is in the zero-zero position on the X-Y axes of FIG. 7, and the controller could be programmed such that rotation of stick 143 about its Z axis could have different effects, or no effect at all, when stick 143 is not in this zero-zero position. By way of example, for safety reasons one may wish to program the controller such that a twisting of stick 143 about its Z axis would have no effect if the joystick is in one of the positions 1 through 16. Alternatively, the controller could be programmed to permit different responses if the joystick 140 is in one of these positions. For example, if joystick 140 is in position 1, which corresponds to the full ahead position and both wheels are being rotated at the same speed, a twist in one direction would subtract rotational speed from one of the two drive units to permit steering. This would be similar to moving the joystick to, for example, positions 2 or 16, but the twist feature may afford the user a more refined steering sense and control over the vehicle direction.

The pushbutton feature of joystick 140 could also be used in different manners. For example, the programming of the controller, such as controller 632 shown in FIG. 6, could allow pushbutton 145 to activate an auxiliary function or device of vehicle 600, such as mowing deck 617, for example. Alternatively, the programming of controller 632 could conditionally allow activation of an auxiliary function or device, such as mowing deck 617, dependent upon the position of joystick 140 and/or may disable an auxiliary function or device, such as mowing deck 617, dependent upon the position of joystick 140. Furthermore, through programming of controller 632, a combination of vehicle 600 conditions, including the position of joystick 140, could be used to allow activation or to disable an auxiliary function or device. It should also be noted that the pushbutton feature may comprise different switch types, such as locking or momentary, depending on the controlled function.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A control system for use in a vehicle having a pair of drive units, each drive unit independently powering a left driven wheel of the vehicle or a right driven wheel of the vehicle, wherein the vehicle is capable of moving in a plurality of forward directions, a plurality of reverse directions, a clockwise zero turn motion, and a counterclockwise zero turn motion, the control system comprising:
   a power source;
   a controller powered by the power source and in electrical communication with the pair of drive units, the controller having programmed therein a plurality of driving modes selectable by a user, the plurality of driving modes comprising at least a first driving mode and a second driving mode; and
   a joystick electronically connected to the controller to provide user inputs to the controller to separately control the rotational speed and direction of the left and right driven wheels of the vehicle, the joystick being pivotable about a pivot point between a plurality of pivot positions, each of the plurality of pivot positions corresponding to a particular rotational speed and direction of each of the driven wheels;
   wherein each of the plurality of driving modes maps a different set of rotational speeds and rotational directions for each of the driven wheels onto the plurality of pivot positions and each of the plurality of driving modes has a maximum clockwise zero turn speed, a maximum counterclockwise zero turn speed, a maximum full forward speed and a maximum full reverse speed; and
   wherein, in the first driving mode, the rotational speed of the driven wheels at the maximum full forward speed is equal to the rotational speed of the driven wheels at the maximum full reverse speed, and in the second driving mode, the rotational speed of the driven wheels at the maximum full forward speed is greater than the rotational speed of the driven wheels at the maximum full reverse speed; and
   wherein, in at least one of the plurality of driving modes, the rotational speed of the driven wheels at both the maximum clockwise zero turn speed and the maximum counterclockwise zero turn speed are both less than the rotational speed of the driven wheels at either the maximum full forward speed or the maximum full reverse speed.

2. The control system of claim 1, further comprising a selector switch for selecting one of the plurality of driving modes.

3. The control system of claim 1, wherein the joystick is rotatable in both a clockwise direction and a counterclockwise direction about a vertical axis to create a plurality of rotational positions, wherein rotation of the joystick in the clockwise direction moves the vehicle in the clockwise zero turn motion, and rotation of the joystick in the counterclockwise direction moves the vehicle in the counterclockwise zero turn motion.

4. The control system of claim 3, further comprising a pushbutton located on the joystick and acting as a selector switch for selecting one of the plurality of driving modes.

5. The control system of claim 3, wherein at least one of the plurality of driving modes permits the controller to process pivot position information and rotational position information of the joystick in combination, to control the rotational speed and direction of each of the driven wheels.

6. The control system of claim 5, wherein at least one of the plurality of driving modes permits the vehicle to be steered in the plurality of forward directions by varying the rotational position of the joystick when the joystick is pivoted forward from the vertical axis.

7. The control system of claim 1, wherein in one of the plurality of driving modes, when the joystick is moved to one of the plurality of pivot positions, to the back and right with respect to a vertical axis of the joystick, the vehicle will move in reverse to the left, and when the joystick is moved to a second of the plurality of pivot positions, to the back and left with respect to the vertical axis, the vehicle will move in reverse to the right.

8. The control system of claim 7, wherein in another of the plurality of driving modes, when the joystick is moved to a third of the plurality of pivot positions, to the back and right with respect to the vertical axis, the vehicle will move in reverse to the right and when the joystick is moved to a fourth of the plurality of pivot positions, to the back and left with respect to the vertical axis, the vehicle will move in reverse to the left.

9. The control system of claim 8, wherein the plurality of driving modes further comprises a third driving mode wherein rotation of the joystick about the vertical axis to a first rotated position moves the vehicle in the clockwise zero turn motion and rotation of the joystick about the vertical axis to a second rotated position moves the vehicle in the counterclockwise zero turn motion.

10. The control system of claim 9, wherein the joystick must be in a vertical orientation to enable the third driving mode.

11. The control system of claim 10, further comprising a fourth drive mode wherein at least two of the plurality of pivot positions comprise programmed stop positions where the left and right driven wheels are not powered.

12. The control system of claim 1, wherein the joystick further comprises a physical stop to prevent the joystick from accessing a predetermined subset of the plurality of pivot positions.

13. The control system of claim 12, wherein the predetermined subset of the plurality of pivot positions corresponds to zero rotation of the driven wheels.

14. The control system of claim 1, wherein the controller comprises a first controller operatively connected to a first of the pair of drive units, and a second controller operatively connected to a second of the pair of drive units and the first controller is operatively connected to the second controller.

15. A control system for use in a vehicle having a pair of drive units, each drive unit independently powering a left driven wheel of the vehicle or a right driven wheel of the vehicle, wherein the vehicle is capable of moving in a plurality of forward directions, a plurality of reverse directions, a clockwise zero turn motion, and a counterclockwise zero turn motion, the control system comprising:
 an electric controller powered by a power source and in communication with the pair of drive units; and
 a joystick electronically connected to the electric controller to provide user inputs to the electric controller to control the rotational speed and direction of the two separate driven wheels of the vehicle, the joystick comprising:
  a vertical stalk pivotable about a pivot point between a plurality of pivot positions, each of the plurality of pivot positions corresponding to a particular rotational speed and direction of the left driven wheel and the right driven wheel, and twistable about a vertical axis extending through the pivot point between a plurality of twist positions; and
  a selector switch for selecting one of a plurality of driving modes stored in the electric controller;
 wherein each of the plurality of driving modes maps a different set of speeds and directions for each of the driven wheels onto the plurality of pivot positions and the plurality of twist positions, and each of the plurality of driving modes has a maximum clockwise zero turn speed, a maximum counterclockwise zero turn speed, a maximum full forward speed, and a maximum full reverse speed;
 wherein at least one of the plurality of driving modes comprises a zero turn mode where the vertical stalk of the joystick may be twisted in a clockwise direction about the vertical axis to move the vehicle in the clockwise zero turn motion and in a counterclockwise direction about the vertical axis to to move the vehicle in the counterclockwise zero turn motion; and
 wherein, in at least one of the plurality of driving modes, the rotational speed of the driven wheels in both the maximum clockwise zero turn speed and the maximum counterclockwise zero turn speed are both less than the rotational speed of the driven wheels at the maximum full forward speed.

16. The control system of claim 15, wherein, in at least one of the plurality of driving modes, the maximum full reverse speed is less than the maximum full forward speed.

17. The control system of claim 16, wherein, in at least one of the plurality of driving modes, the rotational speed of the driven wheels in both the maximum clockwise zero turn speed and the maximum counterclockwise zero turn speed is less than the rotational speed of the driven wheels at the maximum full reverse speed.

18. A control system for use in a vehicle having a left drive unit independently powering a left driven wheel of the vehicle and a right drive unit independently powering a right driven wheel of the vehicle, wherein the vehicle is capable of moving in a plurality of forward directions, a plurality of reverse directions, a clockwise zero turn motion, and a counterclockwise zero turn motion, the control system comprising:
 a power source;
 a controller powered by the power source and in electrical communication with the left drive unit and the right drive unit, the controller having programmed therein a plurality of driving modes selectable by a user, the plurality of driving modes comprising at least a first driving mode and a second driving mode; and
 a joystick electronically connected to the controller to provide user inputs to the controller to control the rotational speed and direction of the left driven wheel and the right driven wheel, the joystick being pivotable between a plurality of pivot positions, the plurality of pivot positions comprising:
  a first set of pivot positions where the controller causes the right driven wheel to be rotated in a forward direction at at least a first rotational speed and the left driven wheel to be either (i) rotated forward at a rotational speed less than the rotational speed of the right driven wheel, (ii) stopped, or (iii) rotated in reverse, depending on a specific selected pivot position within the first set of pivot positions and whereby the vehicle will turn in a forward left direction at different turning radii for each specific pivot position within the first set of pivot positions, and as the turning radius of the vehicle decreases, the controller causes the right drive unit to reduce the forward rotational speed of the right driven wheel; and
  a second set of pivot positions where the controller causes the left driven wheel to be rotated in a forward direction at at least the first rotational speed and the right driven wheel to be either (i) rotated forward at a rotational speed less than the first rotational speed of the left driven wheel, (ii) stopped, or (iii) rotated in reverse, depending on a specific selected pivot position within the second set of pivot positions and whereby the vehicle will turn in a forward right direction at different turning radii for each specific pivot position within the second set of pivot positions and as the turning radius of the vehicle decreases, the controller causes the left drive unit to reduce the forward rotational speed of the left driven wheel;

wherein each of the plurality of driving modes maps a different set of rotational speeds and rotational directions for each of the driven wheels onto the plurality of pivot positions and each of the plurality of driving modes has a full forward position and a full reverse position.

19. The control system of claim 18, wherein, in the first driving mode, the rotational speed of the driven wheels in the full forward position is equal to the rotational speed of the driven wheels in the full reverse position, and in the second driving mode, the rotational speed of the driven wheels in the full forward position is greater than the rotational speed of the driven wheels in the full reverse position.

20. The control system of claim 18, wherein the plurality of pivot positions further comprises:

a third set of pivot positions where the controller causes the right driven wheel to be rotated in a reverse direction at a third rotational speed and the left driven wheel to be either (i) rotated in reverse at a fourth speed less than the third rotational speed, (ii) stopped, or (iii) rotated forward, depending on a specific selected pivot position within the third set of pivot positions and whereby the vehicle will turn in a reverse left direction at different turning radii for each specific pivot position within the third set of pivot positions; and a fourth set of pivot positions where the controller causes the left driven wheel to be rotated in a reverse direction at the third rotational speed and the right driven wheel to be either (i) rotated in reverse at a speed less than the third rotational speed, (ii) stopped, or (iii) rotated forward, depending on a specific selected pivot position within the fourth set of pivot positions and whereby the vehicle will turn in a reverse right direction at different turning radii for each specific pivot position within the fourth set of pivot positions.

21. The control system of claim 20, wherein within the third set of pivot positions, as the turning radius of the vehicle decreases, the controller causes the right drive unit to reduce the rotational speed of the right driven wheel and, within the fourth set of pivot positions, as the turning radius of the vehicle decreases, the controller causes the left drive unit to reduce the rotational speed of the left driven wheel.

22. The control system of claim 18, wherein the joystick may be twisted in a clockwise direction about a vertical axis to move the vehicle in the clockwise zero turn motion and in a counterclockwise direction about the vertical axis to move the vehicle in the counterclockwise zero turn motion.

* * * * *

UNITED STATES PATENT AND TRADEMARK OFFICE
CERTIFICATE OF CORRECTION

PATENT NO.         : 10,150,501 B1
APPLICATION NO.    : 15/670873
DATED              : December 11, 2018
INVENTOR(S)        : Alyn Brown et al.

Page 1 of 1

It is certified that error appears in the above-identified patent and that said Letters Patent is hereby corrected as shown below:

In the Claims

Claim 20, Column 13, Line 25, "reverse at a fourth speed" should be changed to --reverse at a speed--.

Signed and Sealed this
Twenty-seventh Day of August, 2019

Andrei Iancu
*Director of the United States Patent and Trademark Office*